United States Patent [19]

Dubreuil et al.

[11] Patent Number: 4,500,747
[45] Date of Patent: Feb. 19, 1985

[54] GAS PRESSURIZABLE CABLE WITH COMPRESSED PLUG SEAL AND METHOD OF MAKING IT

[75] Inventors: Luc Dubreuil, St. Placide; Phillip J. Reed, Dorval, both of Canada

[73] Assignee: Northern Telecom Limited, Montreal, Canada

[21] Appl. No.: 480,258

[22] Filed: Mar. 30, 1983

[51] Int. Cl.³ .................... H02G 15/23; H02G 15/25
[52] U.S. Cl. ........................... 174/76; 174/20; 174/22 R; 264/279.1
[58] Field of Search ............... 174/19, 20, 21 R, 22 R, 174/23 R, 74 R, 76, 77 R, 84 R, 88 R, 93; 29/858; 156/49; 264/261, 279, 279.1

[56] References Cited

U.S. PATENT DOCUMENTS

| | | | |
|---|---|---|---|
| 3,187,081 | 6/1965 | Bollmeier | 174/21 R |
| 3,885,087 | 5/1975 | Takada et al. | 174/22 R X |
| 4,152,538 | 5/1979 | Gassinger et al. | 174/76 X |

FOREIGN PATENT DOCUMENTS 1124985  8/1968  United Kingdom .................. 174/76

OTHER PUBLICATIONS

Fukutomi, H., et al., "Prefabricated Pressure Dam For Telephone Cable", Twentieth International Wire and Cable Symposium—Atlantic City, N.J., Nov. 3–Dec. 2, 1971, pp. 140–144.

Primary Examiner—Laramie E. Askin
Attorney, Agent, or Firm—R. J. Austin

[57] ABSTRACT

Cable plug and method of manufacture in which hardened plugging compound surrounds individually insulated conductors and a radially resilient spring is placed around the compound which holds the spring permanently in a resiliently expanded condition to compress the compound onto the individual insulations of the conductors. In one arrangement a sleeve surrounds and intimately contacts the compound and at least one rib on the inner surface of the sleeve is urged against a complementary groove in the compound by the spring.

9 Claims, 10 Drawing Figures

GAS PRESSURIZABLE CABLE WITH COMPRESSED PLUG SEAL AND METHOD OF MAKING IT

This invention relates to plugs for gas pressurizable cable. It is common practice to install telecommunications cables in regions in which moisture is to be found at least occasionally. Unless steps are taken to avoid the ingress of moisture into the cables it is possible for moisture to permeate into the cable cores and this has an effect not only upon the performance of conductors in the cable, but also upon the physical condition of the conductors and cables themselves. It has been common practice to prevent or restrict the ingress of moisture, either by pressurizing the inside of a cable with gas, or more recently, to use grease filled cables.

Obviously, where gas pressurized cables are used, it is essential to provide means to prevent or restrict the escape of gas from inside the cables so as to maintain the pressure. Such means has conventionally comprised the use of plugs either at cable ends or between lengths of pressurized cable where two lengths have been subjected to pressure from two different sources. When the plug is disposed at a cable end, it may be installed in a stub cable which is a short length of cable connected by a splicing operation to a main cable length.

It has been accepted procedure to form plugs by the use of a flowable plugging compound which has been forced to flow between the conductors of a cable and has then been allowed to set or cure in situ to provide the seal, either at the cable end or between one cable and another. Such plugs are formed in situ upon cables, i.e. after cables have been installed in the field, for instance in manholes to which underground cables extend. Such methods of forming plugs in situ tend to be expensive, they are difficult to make under the ambient conditions, and the setting time for the flowable material into a plug depends largely upon the ambient temperature. For instance, it is not unknown for plugs to require at least 24 hours in which to set in extremely cold conditions and, to accelerate the drying procedure, heaters are sometimes located within the manholes and close to the plug. An inordinate number of man hours can therefore be spent in the making of a single plug. Apart from this the conditions in which the plug is formed do not assist in insuring its sealing efficiency and some leakage of the pressurized gas is normally expected from the plug. Of course, to maintain a minimum gas pressure within a cable in the event of such leakage, then extremely efficient gas pressurization equipment needs to be used and the periods of use of such equipment for maintaining the gas pressure is increased by the rate of leakage of pressurized gas from the cable.

A further problem which exists with conventional plugs is that they are subjected to extremes in temperature conditions, e.g., possibly between $-25°$ C. and up to $+30°$ C. dependent upon the season. Because of the different coefficients of expansion of the different materials within a cable, e.g., the sheath, the jacket, the conductor insulation, the conductors and the plugging material, such widely differing temperatures are known to result in undesirable leakage paths for pressurized gas. Attempts have been made to prevent or minimize such leakage paths, but leaks have not been eliminated and still cause problems in maintenance of gas pressure.

In U.S. Pat. No. 3,187,081 granted June 1, 1965 to E. W. Bollmeier, there is described a cable connection between two cable ends and in which each cable end is provided with a plug. Each plug is formed by pouring a self-curing liquid flooding material into a tapered sleeve. The narrow end of the sleeve surrounds an end of the cable jacket and extends outwardly to surround insulated conductors projecting axially from the jacket. The flooding material hardens to form a solid plug surrounding the conductors and substantially filling the sleeve. Although the resinous plug surrounds the conductors intimately when it is set, the relative expansions and contractions of the materials during temperature changes may result in leakage paths developing along the plug from inside the gas pressurized cable. In particular, there is the possibility of a leakage path developing between a conductor and a loosely fitting layer of insulation. The provision of a plug which does not contact the conductor surface itself in no way prevents or closes such a leakage path.

In a later patent, U.S. Pat. No. 4,152,538, granted May 1, 1979 to H. A. Gassinger et al, a pressurized cable termination seal is described in which a plug is contained within a metal sleeve which also surrounds an elastomeric sleeve. Both sleeves surround an end jacket portion of the cable and extend axially outwardly from the jacket so as to encompass projecting insulated conductors and form a mold surface for the pouring of plugging compound. With this construction, the metal sleeve is crimped onto the elastomeric sleeve and the jacket in the jacket region to compress the materials of the cable and close any potential leaks. However, leaks may develop because of different expansion and contraction characteristics of the materials. In addition, although the crimping of the metal sleeve is for the purpose of preventing leaks, this crimping takes place around a corrugated metal shield of the cable. In this case the compressive force provided by crimping would be largely prevented from reaching to the insulated conductors by the shield and would be ineffective in preventing any leakage path which is likely to develop around the conductors or between the conductors and their insulation.

It would be an advantage to provide a cable plug seal which would not only minimize leakage paths within the plug and outwardly of conductor insulation, but also any leakage paths which may develop between each conductor and its own insulation.

Accordingly, the present invention provides a method of providing a plug seal for a gas pressurizable cable comprising taking the cable in which a certain cable length is devoid of core surrounding material, causing a flowable plugging compound to flow between and surround insulated conductors of the core in said devoid length so as to engage the insulation of individual conductors intimately and also to flow around end regions of the jacket lying adjacent to said devoid length, allowing the compound to harden into a plug, and placing the plug in radial compression in at least one axial position along said devoid length by disposing around it a radially resilient spring which is in a permanently resiliently expanded condition when around the plug so as to compress the plug radially inwards and compress the insulation of the conductors onto the conductors, the hardened plug being radially compressible with insignificant axial displacement of the plug material along the cable.

Preferably, to prevent leaks between the compound and the end regions of the jacket, means is provided to assist the seal. This means may be another radially resilient spring placed around the hardened compound of the plug in a position surrounding the jacket and this spring is in a permanently, resiliently, expanded condition so as to radially compress the plug against the jacket surface.

In a preferred method, said other spring is omitted and the method preferably includes the location of a sleeve around the plug and extending outwardly from around the end regions of the jacket and along said devoid length. This sleeve which is preferably tapered, is also advantageously provided with at least one, and preferably a series, of annular ribs on its inner surface. The plug is shaped intimately to the inside surface shape of the sleeve and thus is formed with complementary grooves, which are intimately contacted by the ribs of the sleeve. In this method, the spring which surrounds the devoid length is placed around the sleeve which is inwardly deformable to enable the spring to compress the plug for the purpose of compressing the insulation of the conductors onto the conductors. In this preferred method, this spring is advantageously placed adjacent to or between ribs of the sleeve so that the radial compression will more intimately force together the complementary ribs and corresponding grooves. It is also preferable to provide a seal at the end of the sleeve which surrounds the jacket for the purpose of preventing gas leakage paths developing from the inside of the cable along the jacket and outwardly beyond this end of the sleeve. This seal is conveniently provided by wrappings of a sealing tape material. As an alternative to this, the seal at this end of the sleeve may be formed for instance by an injection molding procedure to place a molded sealing compound in sealing position. It is preferable that this sealing compound is compatible with the sleeve material and the jacket material so that the heat of injection fuses the sealing material to the sleeve and to the jacket.

The invention also includes a cable having a plug seal in which the cable has a certain length which is devoid of core surrounding material and the plug seal comprises: (a) a plug formed by hardened plugging compound which surrounds the core along said devoid length and surrounds and is sealed against end regions of the jacket lying adjacent to the devoid length, the plug in said devoid length extending around and in intimate engagement with the insulation of each individual conductor of the core and; (b) a radially resilient spring which surrounds the plug in at least one axial position of said devoid length, the spring being in a permanently resiliently expanded condition to permanently place a radially inward compressive force upon the plug, the plug having insignificant axial displacement under the compressive force to cause the plug to compress the insulation of the individual conductors onto the conductors.

With the above construction, any leakage path which would tend to develop along the plug from inside the cable is prevented by the compressive force which forms a sealing effect between the mating surfaces of the plug, the insulation and conductors.

While the compound should seal against the jacket, means is preferably provided to assist in such seal. This means may comprise another radially resilient spring which is placed around the plug in a position surrounding the jacket.

In a preferred construction, a sleeve is provided around the compound, and the spring is located around the sleeve in the devoid region. The sleeve is inwardly deformed by the spring sufficiently to cause the spring to deform the compound so as to compress the insulation against the individual conductors. This sleeve may be formed for instance from polyethylene and is advantageously in tapered shape with the narrow end surrounding the jacket and flaring outwardly across the devoid region of the cable.

Embodiments of the invention will now be described, by way of example, with reference to the accompanying drawings in which.

Figure 1:
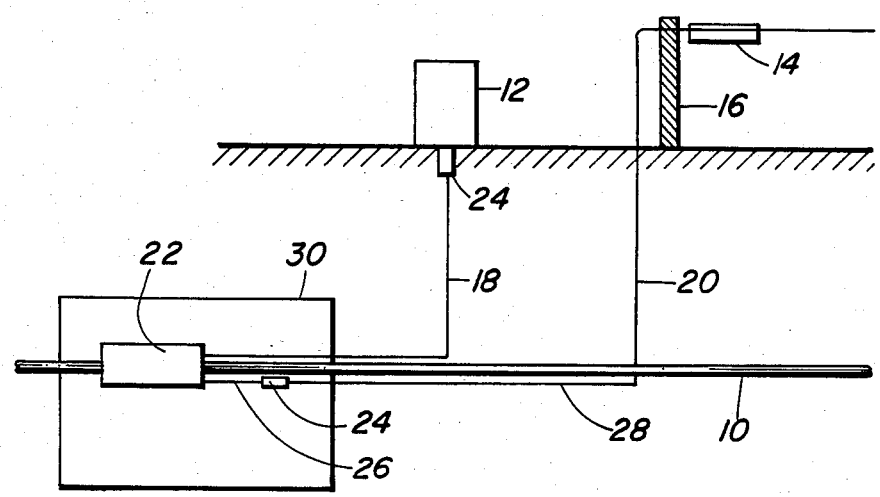
FIG. 1 is a schematic drawing showing the use of plugs in lateral cables from a main cable underground level to junction boxes disposed above ground level.

In the first embodiment, FIG. 1 shows the layout for the connection of a main cable 10 to wire junction equipment in the form of a jumper wire installation 12 within a building and a ready access position 14 disposed above the ground on a telegraph pole 16. The main cable 10 is connected to both pieces of wire junction equipment by lateral cables 18 and 20 through a splice 22.

The main cable 10 is a conventional air pressurized telecommunications cable. It is necessary to provide plugs to prevent the pressurized air from escaping from the main cable at some position along the lateral cables 18 and 20. For this purpose, a plug seal 24 is provided in each of the lateral cables. As shown in FIG. 1, the plug 24 in cable 18 is located at ground level as the lateral cable reaches the jumper wire installation. Hence the pressurized air in the main cable 10 also extends through the splice and along the cable 18 to the plug 24. The plug in cable 20 is disposed between sections 26 and 28 of cable 20 and is disposed within a manhole 30 together with the splice. Hence the air pressure within main cable 10 extends along the short cable 26 to this plug 24 and the section 28 is unpressurized. Each of the plugs 24 is formed at the end of lateral cable 18 or cable section 26 by a factory process. The plugs together with their cable lengths are then transported to the site of their installation and are fitted in the system shown by FIG. 1.

Figure 2:
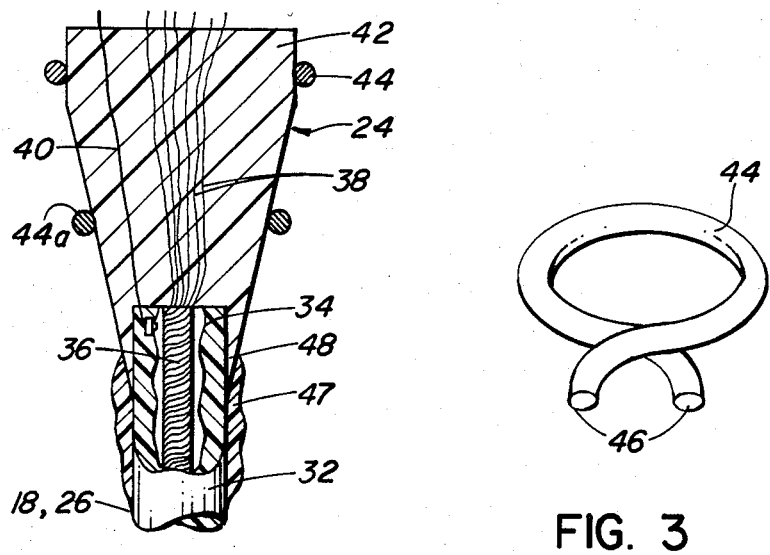
FIG. 2 is a cross-sectional view taken through a plug provided in one of the lateral cables shown in FIG. 1.

As shown by FIG. 2, each plug seal 24 is formed partially around an end 32 of the cable jacket which is co-extensive with a corrugated metallic shield 34 and any other covering layers such as a core wrap for a core 36. The core wrap and any other covering layers are not shown in the drawings. The plug seal also extends along insulated conductors 38 forming the core and projecting from the jacket so as to encapsulate parts of these conductors. The conductors extend outwardly beyond the plug seal, either for the purpose of joining to the cable part 28 or to the wiring in the jumper wire installation 12 as the case may be. Also, a ground wire 40 which is secured to the shield 34, extends through the plug in the direction of the insulating conductors for connection to ground or to a metal shield of the cable part 28.

The plug seal comprises a plug 42 which is formed in hardened condition in the finished structure.

Figure 3:
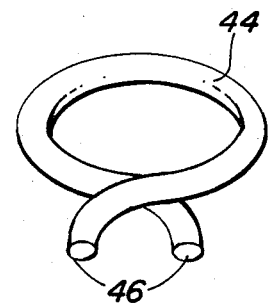
FIG. 3 is an isometric view of a resilient spring used in the construction of the plug of FIG. 2.

Around the plug where it extends beyond the jacket 32, there is disposed a radially resilient spring means in the form of an arcuate spring 44 which follows a substantially circular path and has overlapping ends 46 (FIG. 3) which turn outwardly for the purpose of enabling a tool to be applied to the ends to open the spring in a radial direction. To position the spring 44 around the plug 42, the ends 46 are moved towards each other to open up the spring and, in the final assembled form as shown in FIG. 2, the spring completely surrounds the plug with the ends 46 still overlapping. In the assembled form, spring 44 is permanently held by the plug at a diameter which is greater than its unstressed diameter so as to apply a radially compressive force to the plug around the whole circumference of the plug. The spring is embedded slightly into the plug as shown by FIG. 2. The hardened plug is of a material which does not displace axially to any significant extent, such that the radially compressive force acts directly inwards whereby the plug is held pressed against the insulation on the individual conductors and in turn presses the insulation against the conductors themselves. A polyethylene polyol compound known as "Y Plug Compound" manufactured by Chemque Canada Limited, a Minnesota Mining Manufacturing plugging compound sold under their brand number 4407-A1, and a polyurethane plugging compound sold by Biwax Corporation under their brand number 82.526 have all been found suitable for the plug material.

In this construction, more than one spring 44 may be used if desired and, as shown at 44a in FIG. 2, a second spring is added in the covering material devoid region to assist the spring 44 in providing a gas pressurized seal.

Where the jacket end region 32 extends outwardly from the plug 42, wrappings of plastic sealing tape 47 are provided, which extend across the junction of jacket and plug so as to cover the extreme edge 48 of the plug. This tape operates as a seal assisting means in case any leakage path should develop from inside the core, around the end of the jacket, and along the jacket surface between the jacket and the compound 42.

It is found in use that the plug seal prevents air leakage from within a cable. In tests performed to determine gas leakage from this seal, it has been shown that there has been substantially no leakage of pressurized gas from within the cable through the plug. The reason for this is considered to be that the compressed plug 42 underlying the spring 44 is permanently compressed against the insulation surrounding the conductors so as to maintain a seal at this interfacial region and also urges the insulation against the conductors themselves to form a seal at these points. Thus, if there is any tendency for there to be a leakage path between any conductor and its insulation, then this leakage path is closed because of the compressive force.

The spring 44 is held by the plug 42 at a greater radius than its normal unstressed condition, and should there be any wide differences in temperatures in use of the plug, then the spring will move radially under the contraction or expansion of the plug 42 to continuously apply the compressive force. Thus, the resiliency of the spring ensures that total sealing efficiency of the plug does not only occur at one temperature condition.

Figure 4:
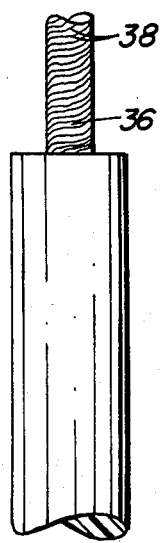
FIG. 4 is a side elevational view of an end of the cable shown in FIG. 2 to illustrate a stage in the process of manufacture of the plug.
Figure 5:
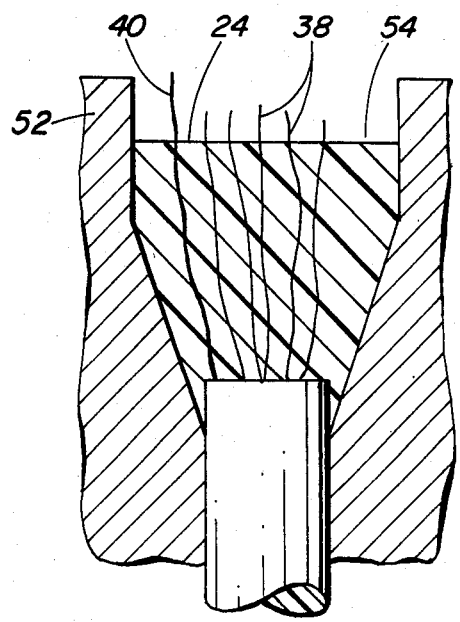
FIG. 5 is a side elevation of the cable showing the plug in cross-section and at a different stage of manufacture from FIG. 4.

To manufacture the plug shown in FIG. 2, the cable 18 or 26 has its core surrounding material, i.e. jacket and shield, removed from its end as shown by FIG. 4. In this condition the conductors 38 extend as a core 36 in stranded form from the end of the cable as shown by FIG. 4. To form the shaped plug 42 around the conductors and the jacket end, the jacket end with the conductors is disposed within a cavity formed by a mold 52 having an open top 54 through which the flowable compound for making the plug is poured at room temperature. It is an essential part of the process to ensure that the insulated conductors 38 are separated from their stranded construction as shown in FIG. 5 so as to enable the plugging compound to flow in between them and to completely surround each individual insulated conductor. This is to ensure that after manufacture each insulated conductor is compressed completely around its circumference by the compressive force. To enable the compound to flow in this manner, it is advantageous to move the insulated conductors by hand from outside the mold during the pouring of the flowable compound, so that the compound fills any gaps between the conductors and all air pockets are removed. Setting up and hardening of the compound into the plug 24 is possible within a short period (e.g. 20 minutes) under factory conditions of temperature and humidity. After the compound has hardened into the plug, the mold 52 is removed and the sealing tape 47 is wrapped in position. Also the spring 44 (spring 44a, if used) is located around the plug as described with reference to FIG. 2.

Because each plug is made under factory conditions, there is a greater control on the quality of the product than is made possible with the manufacture of plugs in situ in the field under differing weather and situation conditions.

Figure 6:
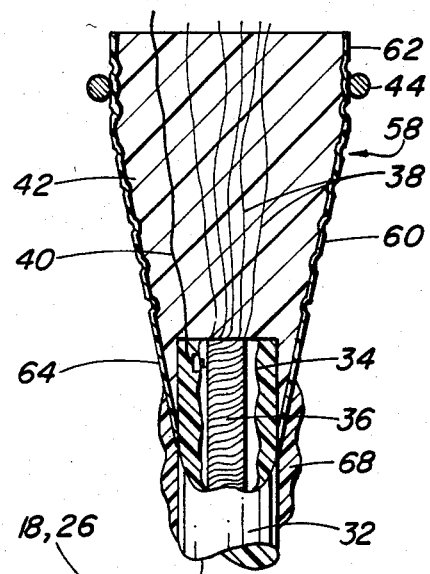
FIG. 6 is a view similar to FIG. 2 of a second embodiment.

In a second embodiment as shown in FIG. 6, a plug seal 58 is used as an alternative to plug seal 24. The plug seal 58 is of the construction described for the plug seal 24 except that there is provided a sleeve 60 surrounding the plug 42. This sleeve has a straight substantially cylindrical portion 62 terminating in a longer tapering portion 64 which tapers down to a diameter closely surrounding the cable jacket of the cable 18 or 26. In the method of manufacturing this construction, the sleeve 60 forms the mold for pouring the compound for plug 42 whereby the mold 52 is not required. After the compound has hardened, the sleeve 60 remains in position and the spring 44 is located (as shown) around the sleeve either on the cylindrical portion 62 or along the tapering portion 64, but still in a position lying axially outwardly from the end of the jacket and the shield. The sleeve is formed from the same material as the jacket, i.e. polyethylene, but may be formed of other materials. The essential requirement for the sleeve is that it is easily deformable by the spring 44 to enable the spring to apply a compressive force through the sleeve to the plug 42 to provide the sealing effect to the insulated conductors in the manner described in the first embodiment. It is obvious that a rigid material for the sleeve would not suffice for this purpose as it would prevent the compressive force from reaching the compound 42 and the object of the invention would not be obtained.

Figure 7:
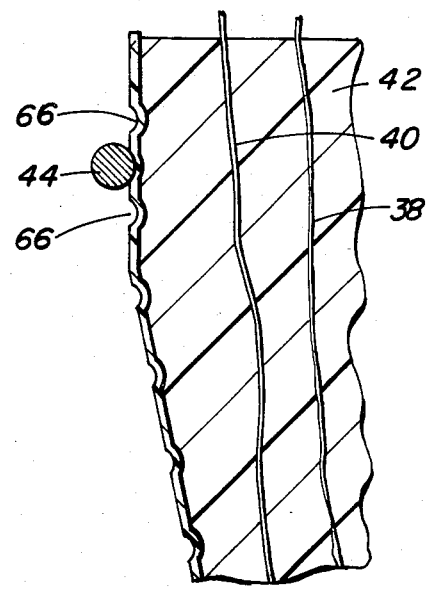
FIG. 7 is a view similar to FIG. 2, of part of the plug of FIG. 6 and on a larger scale.

As is shown more clearly from FIG. 7, the sleeve 60 is formed with a plurality of spaced annular ribs 66. The plug 42 is molded intimately into the sleeve and thus flows around each of the ribs to form a corresponding groove or recess. As shown by FIG. 7, the spring 44 is disposed adjacent one of the ribs and preferably between and substantially close to two of the ribs 66, whereby each of the ribs is deflected inwardly and into more intimate engagement with the grooves formed in the plug 42.

A seal assisting means is disposed at the junction of the tapered end of the sleeve with the jacket as shown by FIG. 6. The seal assisting means consists of a wrapping of sealing tape 68.

In use, a sealing effect is provided under compression of plug 42 against each of the insulated conductors 38 as described with regard to the first embodiment. In addition to this, the sleeve also operates as a sealing means should there be any leakage around the end of the cable jacket towards the tapered end of the sleeve. Any pressurized air needs to leak beneath the tape 68 before the inside of the cable is in communication with the ambient atmosphere, or it needs to leak in the opposite direction, i.e. between the sleeve and the compound 42. To prevent such a leak, the plug 42 forms with the sleeve a further seal against leakage. In addition, the spring 44 assists in preventing leakage of air by forcing the sleeve against the plug and the ribs against the corresponding grooves.

Figure 8:
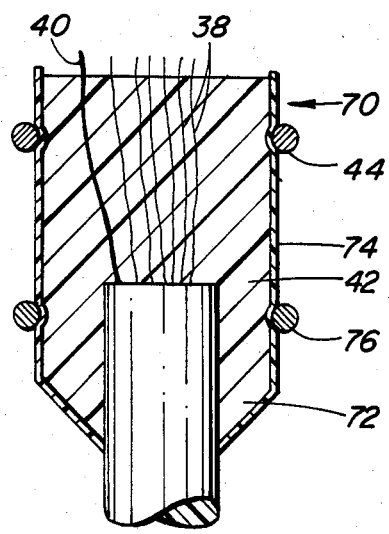
FIG. 8 is a view similar to FIG. 2 and of a third embodiment.

In a third embodiment as shown in FIG. 8, the shape of a plug seal 70 is different from that in the first and second embodiments. As shown by FIG. 8, the plug seal 70 is substantially cylindrical for most of its length with a cylindrical portion extending over the jacket of the cable terminating with a short tapering section 72. As with the second embodiment, the shape of this plug seal is defined by a sleeve 74 into which the compound for the plug material is poured.

As shown by FIG. 8, a spring 44 is disposed in the region of the plug in the region of cable devoid of core covering and performs the same function as in the second embodiment. In addition to this, any sealing effect is assisted by a seal assisting means comprising another spring 76 of the same construction as the spring 44, the spring 76 being disposed around the cylindrical portion of the sleeve which overlies the jacket. This spring holds the plug 42 compressed tightly against the jacket material to prevent the development of any leak passages at the interfacial region. The spring 76 may be used as an alternative to the sealing tape shown in FIGS. 2 and 6 or may be used in addition to it. The sealing tape is not present in the third embodiment as illustrated in the drawing.

Figure 9:
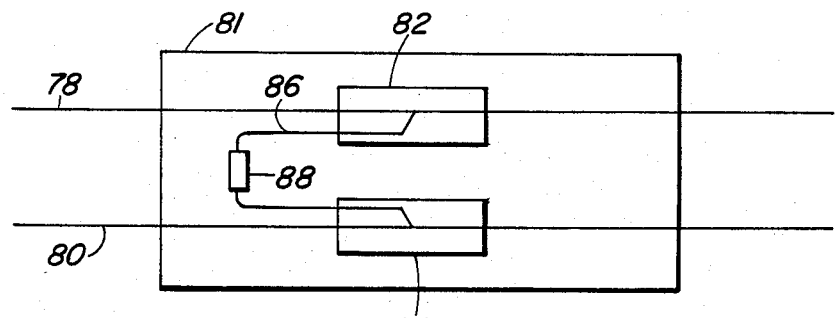
FIG. 9 is a schematic plan view showing a lateral cable connection between two main cables and incorporating a plug according to a fourth embodiment in the lateral cable.
Figure 10:
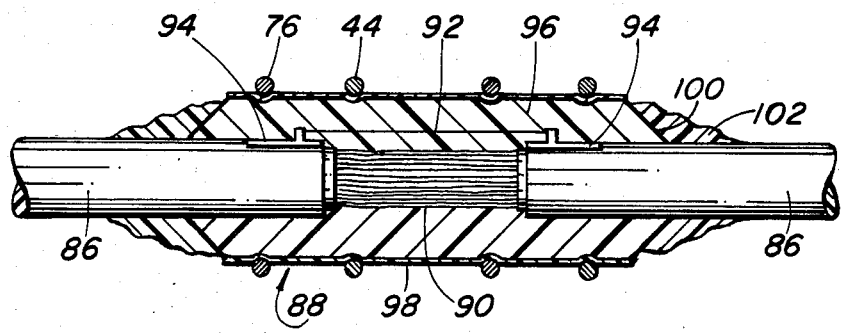
FIG. 10 is a side elevational view partly in cross-section of the plug in FIG. 9.

In a fourth embodiment as shown by FIG. 9, two main cables 78 and 80 lie along substantially parallel paths and pass through a manhole 81 in which splices 82 and 84 are formed in known manner to connect together certain conductors from each of the cables. The two main cables are subjected to individual pressurization from separate pressurization systems. In case an air leak should develop in one of the cables, it is essential to prevent the air leak from affecting the air pressure in the other cable. Thus, where a lateral cable 86 is provided between the two splices to electrically connect conductors in one cable 78 or 80 with the other, then a plug seal 88 is disposed within the cable 86 to prevent interconnection between the air pressure systems. As shown by FIG. 10, the cable 86 has an axially extending region 90 devoid of core covering layers. Before addition of the plugging material, a ground wire 92 is provided to bridge the gap between the parts of the shield which remain under the jacket material on each side of the region 90. The ground wire is connected by bond clamps 94 to the shield in conventional fashion. Plugging material, of the same composition as discussed in the first embodiment, is added to provide the plug 96. In the arrangement shown by FIG. 9, a sleeve 98 is held around the section 90 of the cable and extends over the two end regions of the jacket adjacent section 90. A slit (not shown) in the sleeve is provided through which the molten compound is poured. Prior to pouring, the insulated conductors are moved apart from their stranded condition in the core to enable the compound to flow freely between them whereby encapsulation of each individual insulated conductor takes place. To ensure that the plugging material does not flow outwardly beyond the ends of the sleeve, tapered end sections 100 of the sleeve are provided and sealing tape 102 is wrapped around the end sections and around the jacket in this region to form a seal. After the compound 96 has solidified, two springs 44 of the construction described in the first embodiment are placed around sleeve 98 in spaced positions along the cable section 90 so as to compress the sleeve radially inward onto the plug 96, which in turn is compressed inwardly onto the insulated conductors and also forces the insulation on each conductor into intimate contact with each conductor. Hence, pressurized air is prevented from finding a leak path from one side of the plug to the other along the cable 86. It is preferable as shown in the embodiment to add two further springs 76, one towards each end of the sleeve and overlying the jacket of the cable. This will cause the plug to be compressed into permanent intimate contact with the jacket to resist any tendency for an air leak to develop between the jacket and the plug.

It is to be understood that simplified forms of the fourth embodiment are envisaged. For instance, in one modification (not shown), a single spring 44 may be used instead of two. Further, the springs 76 may be dispensed with, on the understanding that the sealing tape 102 is sufficient to prevent any leakage to ambient atmosphere developing between the jacket and the compound. In a further modification (not shown), the permanent sleeve 98 is not used but alternatively a mold is provided for molding the plug 96. The mold is subsequently removed and the springs fit directly in contact with the plug to apply their radial compressive force.

What is claimed is:

1. A method of providing a plug seal for gas pressurizable cable having a core of insulated conductors and core surrounding material including a jacket, the method comprising:
    (a) removing all core surrounding material from an end section of the cable so as to provide a certain length of the cable at its end which is devoid of core surrounding material and which has a jacket end region adjacent to the devoid length;
    (b) locating an inwardly deformable sleeve around and contacting the jacket end region, the sleeve extending along and surrounding the devoid length and being radially spaced from the insulated conductors of the devoid length;

(c) causing a flowable plugging compound to flow into the sleeve, between the insulated conductors so as to surround them and engage the insulation of individual conductors intimately, around the jacket end regions, and into intimate engagement with the inner surface of the sleeve;

(d) allowing the compound to harden into a plug which causes it to seal to the sleeve; and (e) after hardening of the plug and with the sleeve sealed to the jacket end region, placing the plug in radial compression in at least one axial position along said devoid length by moving a radially resilient spring into a position surrounding the sleeve, the spring being in a permanently resiliently expanded condition when around the sleeve so as to compress the sleeve radially inwards to improve its seal against the plug and to compress the plug radially inwards in order to compress the insulation of the conductors onto the conductors.

2. A method according to claim 1, including forming a seal between the sleeve and the jacket end region by disposing a sealing compound across the junction of the sleeve and the jacket, the sealing compound being compatible with the material of the sleeve and jacket, and providing sufficient heat to fuse the compound to the sleeve and the jacket.

3. A method according to claim 1 including placing another radially resilient spring around the sleeve and the hardened compound of the plug in a position surrounding the jacket with said other spring in a permanently resiliently expanded condition, so as to radially compress the plug against the jacket surface.

4. A method according to claim 1 wherein the sleeve is formed with at least one annular rib on its inner surface the method comprising forming an annular groove in the plug in intimate contact with the rib, and locating, the spring in a position to deform the rib inwardly against the groove.

5. A method according to claim 4 wherein the sleeve is provided with two annular ribs on its inner surface and the plug has two annular grooves in intimate contact with the annular ribs, the method including locating the spring in between the ribs so that radial compression of the sleeve forces the ribs into more intimate contact with the grooves.

6. A cable having a core of insulated conductors and core surrounding material including a jacket, and a plug seal in which the cable has a certain length at one of its ends which is devoid of core surrounding material, the plug seal comprising:

(a) a plug formed by hardened plugging compound which surrounds the core along said devoid length at the cable end and surrounds and is sealed against end regions of the jacket lying adjacent to the devoid length, the plug in said devoid length extending around and in intimate engagement with the insulation of each individual conductor of the core;

(b) an inwardly deformable sleeve surrounding and sealed to the plug along both said devoid length and the end regions of the jacket, the sleeve extending beyond the plug to form a junction with the jacket and having a seal at its junction with the jacket;

(c) a radially resilient spring surrounding the sleeve in at least one axial position of said devoid length, the spring being in a permanently resiliently expanded condition permanently to place a radially inward compressive force upon the sleeve to improve its seal against the plug and permanently to place a radially inward compressive force upon the plug, the plug being compressed radially inwards to cause the plug to compress the insulation of the individual conductors onto the conductors.

7. A cable having a plug seal according to claim 6 wherein the sleeve has at least one annular rib on its inner surface which is in intimate contact with an annular groove in the plug, and the spring deforms the rib inwardly against the groove.

8. A cable and a plug seal according to claim 7 wherein the sleeve is provided with two annular ribs on its inner surface and the plug has two annular grooves in intimate contact with the annular ribs, the spring being disposed between the ribs and deforming each rib inwardly against its groove.

9. A cable and a plug seal according to claim 6 wherein the seal at the junction with the jacket is a sealing compound which is compatible with the material of the sleeve and the jacket and is fused to the sleeve and jacket.

* * * * *